United States Patent [19]

Louth

[11] Patent Number: 4,514,671
[45] Date of Patent: Apr. 30, 1985

[54] HEAD SCANNING SERVO SYSTEM IN A RECORDING AND/OR REPRODUCING APPARATUS

[75] Inventor: Kenneth Louth, Los Altos, Calif.

[73] Assignee: Ampex Corporation, Redwood City, Calif.

[21] Appl. No.: 364,963

[22] Filed: Apr. 2, 1982

[51] Int. Cl.³ .............................................. G05B 19/28
[52] U.S. Cl. .................................. 318/603; 318/317; 318/327; 318/608
[58] Field of Search ............... 318/327, 317, 603, 608; 364/118

[56] References Cited

U.S. PATENT DOCUMENTS

| | | | |
|---|---|---|---|
| 4,201,936 | 5/1980 | Roumanis | 318/314 X |
| 4,272,818 | 6/1981 | McDaniel | 318/603 X |
| 4,371,819 | 2/1983 | Kaufmann | 318/327 X |
| 4,381,479 | 4/1983 | Wesling et al. | 318/317 |
| 4,412,161 | 10/1983 | Cornaby | 318/603 X |
| 4,413,212 | 11/1983 | Okamoto et al. | 318/327 X |

Primary Examiner—B. Dobeck
Attorney, Agent, or Firm—Roger D. Greer; Ralph L. Mossino; James A. LaBarre

[57] ABSTRACT

An improved microprocessor controlled scanning drum servo adapted for use in a recording and reproducing apparatus is disclosed. The scanner servo includes a velocity loop as well as a position loop, and by virtue of the fact that it is controlled by a microprocessor in a unique way, has extraordinary accuracy because the resolving power of the servo is essentially that of the microprocessor itself. The interrupts to the microprocessor occur in sequence with a first interrupt causing the microprocessor to cease current activity, store all required information in a stack register and thereafter wait until a subsequent interrupt occurs which enables it to immediately act to perform control operations with respect to the scanner servo. This enables the velocity loop to perform the vast majority of the work required by the servo and as a result of this, the phase closed servo loop operates as a positioning loop in the true sense.

18 Claims, 10 Drawing Figures

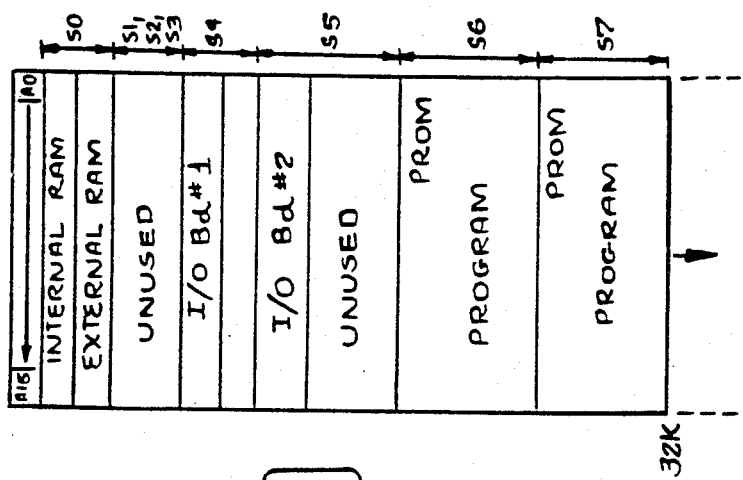
Fig. 4
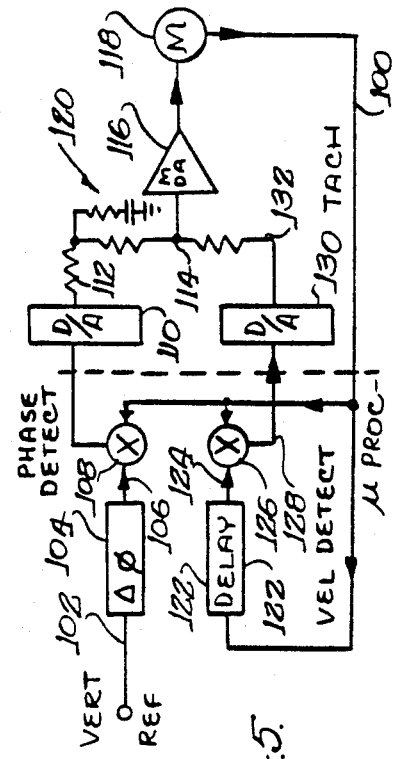
Fig. 5. Scanner Servo
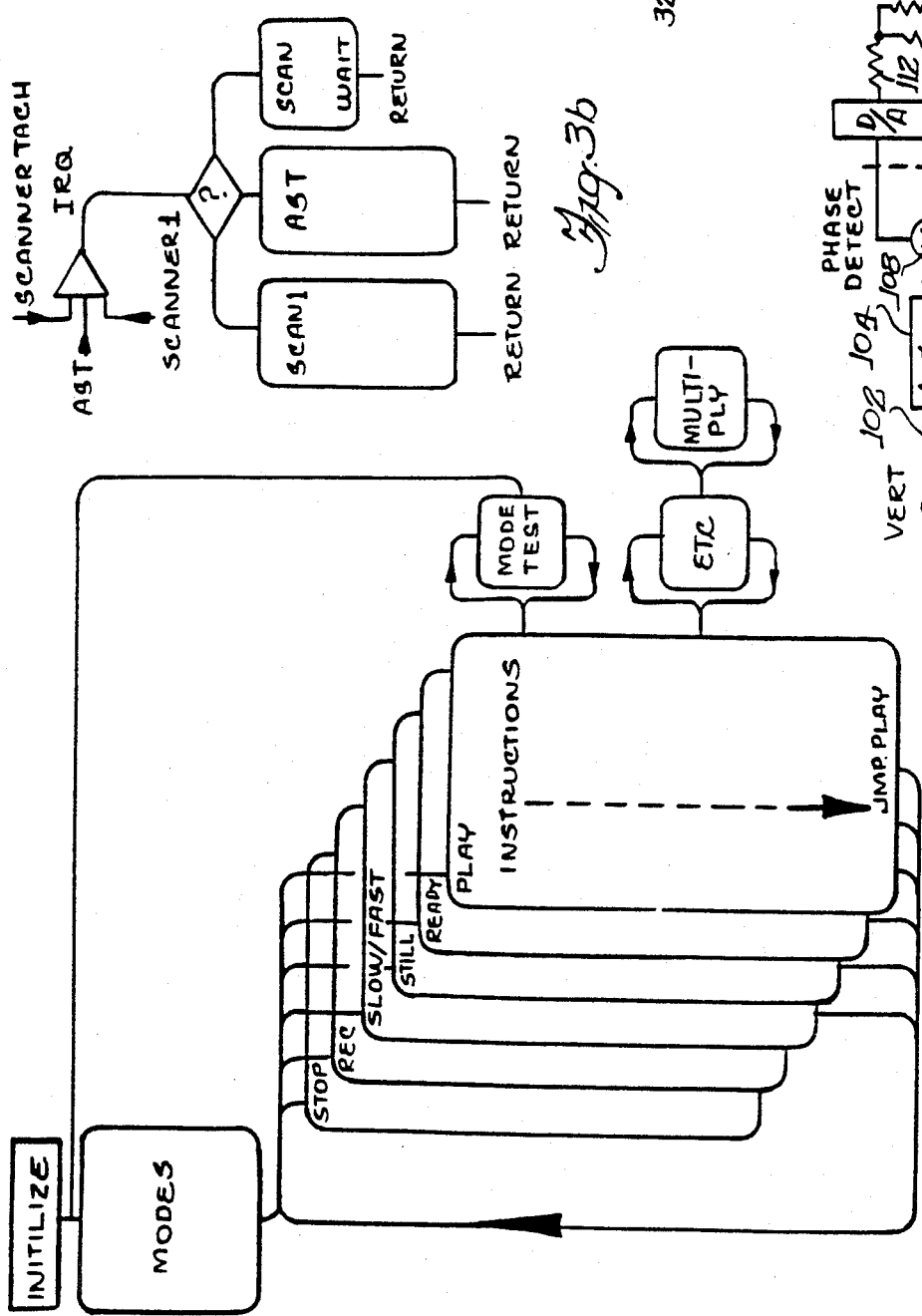
Fig. 3b
Fig. 3a

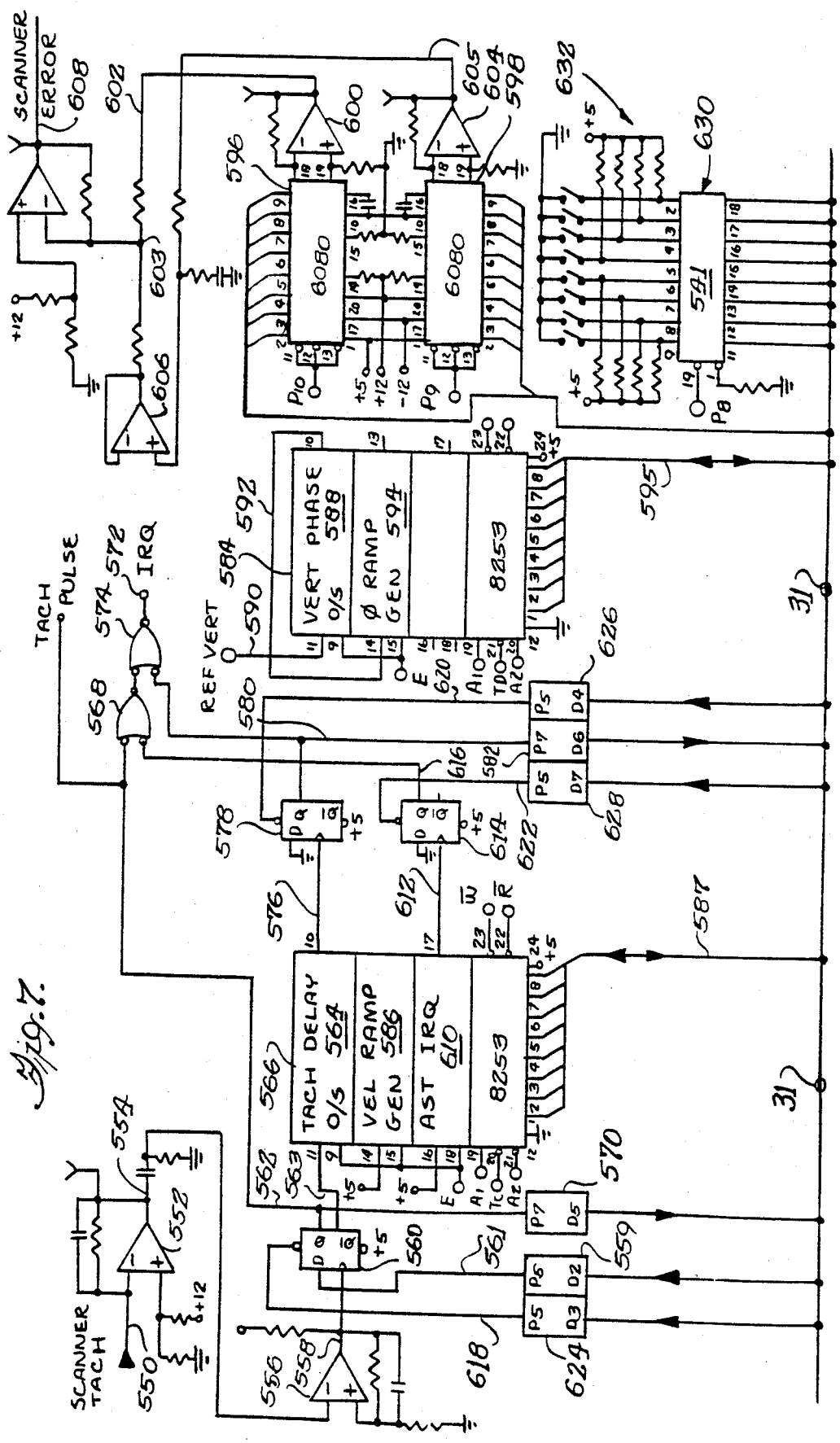

HEAD SCANNING SERVO SYSTEM IN A RECORDING AND/OR REPRODUCING APPARATUS

CROSS REFERENCE TO RELATED APPLICATIONS

MICROPROCESSOR CONTROLLED MULTIPLE SERVO SYSTEM FOR A RECORDING AND/OR REPRODUCING APPARATUS, Ser. No. 364,725, filed Apr. 2, 1982, by Kenneth Louth.

MICROPROCESSOR CONTROLLED REPRODUCING APPARATUS HAVING ASYNCHRONOUS REPRODUCING CAPABILITY, Ser. No. 660,453, filed Oct. 2, 1984, a continuation of Ser. No. 364,793, filed Apr. 2, 1982, by Kenneth Louth and now abandoned.

PHASE DETECTOR CONTROL FOR A SERVO SYSTEM, Ser. No. 608,268 filed May 7, 1984, a continuation of Ser. No. 364,964, filed Apr. 2, 1982, by Kenneth Louth and now abandoned.

AN IMPROVED REEL SERVO SYSTEM IN A RECORDING AND/OR REPRODUCING APPARATUS, Ser. No. 364,652, filed Apr. 2, 1982, by Kenneth Louth.

AN IMPROVED AUTOMATIC SCAN TRACKING SERVO SYSTEM, Ser. No. 364,691, filed Apr. 2, 1982, by Kenneth Louth.

A PROGRAMMABLE NONLINEAR SPEED CONTROL FOR A RECORDING AND/OR REPRODUCING APPARATUS, Ser. No. 364,962, filed Apr. 2, 1982, by Kenneth Louth.

The present invention generally relates to servo systems for recording and reproducing apparatus and, more particularly, to a microprocessor controlled head scanner servo system for a magnetic tape recording and reproducing apparatus.

It is readily appreciated that video recording and reproducing apparatus, particularly, apparatus that records and reproduces video information of broadcast quality, is highly technical and complex equipment that requires sophisticated electronic as well as mechanical components and systems. For broadcast quality recording and reproducing apparatus, particularly video tape recording and reproducing apparatus, the level of technical sophistication is extraordinary in terms of the amount of control that is required to reliably operate the apparatus at broadcast quality standards. Such videotape recording apparatus have a number of servo systems which control their operation, including a servo system for controlling the rotation of the recording and reproducing transducers or heads, the servo system which controls the reel drive motors which drive the supply and take-up reels and the capstan servo system which controls the speed with which the tape is driven during recording and reproducing.

Servo systems for controlling the various motors have generally been relatively independent of one another in prior art systems. In other words, the servo system for the reels and the capstan, while controlled by an operator through conventional control switches and the like tended to operate independently of one another to accomplish the desired function and there was very little actual interaction between one servo system and another, except through such overall control. While such servo systems in the past may have operated under the control of separate microprocessors, each of the servo systems essentially was made to perform the same functions as they had previously.

While the improved head scanner servo of the present invention is only one of the major servos of a recording and/or reproducing apparatus that are controlled by a single microprocessor, the head scanner servo of the present invention contains many desirable functional features that are not found in prior art head scanner servos, including microprocessor controlled head scanner servo systems. There is little doubt that the use of a single microprocessor for controlling all of the major servos in the apparatus results in significant improvement in terms of the inherent communication between various servos and the capability that that entails, i.e., the ability to interact one servo with another in a more intimate manner to provide improved functional capabilities that are very difficult to implement using hardware logic and other circuitry.

Accordingly, it is an object of the present invention to provide an improved head scanner servo for a recording and/or reproducing apparatus which has extraordinary accuracy due to the fact that its resolving power is essentially that of the microprocessor itself.

Yet another object of the present invention is to provide an improved head scanner servo of the foregoing type, which by virtue of it being under microprocessor control has a velocity closed servo loop and a phase closed servo loop, which because of the high resolving capability, enables the velocity closed servo loop to perform the major portion of the servo control so that the phase close servo loop essentially operates as a phase positioning loop in the true sense.

Yet another object of the present invention is to provide an improved head scanner servo of the foregoing type, which because of the extraordinary resolving power of the velocity loop being under microprocessor control, facilitates easy adjustment of the phase to compensate for the amount of delay that may be required for any particular time base corrector that is associated with the recording and reproducing machine.

Another object of the present invention is to provide a unique control of the microprocessor which controls all other major servos in the recording and reproducing machine, so that microprocessor interrupts are timed in a manner whereby when an interrupt occurs for controlling the head scanner servo, it is immediately implemented which enables the scanner servo to respond with great accuracy, it having the resolving power of the microprocessor itself.

Still another object of the present invention is to provide an improved head scanner servo of the foregoing type which can be easily adapted to operate with recordings that are to be made in the NTSC, PAL or SECAM format, with interchanging from one to the other being accomplished by a mere single switching operation.

Other objects and advantages will become apparent upon reading the following detailed description, while referring to the attached drawings.

DESCRIPTION OF THE DRAWINGS

FIGS. 3a and 3b are very broad flow charts illustrating the software functional operation of the microprocessor;

FIG. 4 is a map illustrating the manner in which the software instructions are located within the associated microprocessor memories;

FIG. 5 is a functional block diagram of the head scanner servo system;

FIG. 7 is a detailed electrical schematic diagram illustrating the scanner servo circuitry of the apparatus of the present invention, which detailed circuitry carries out the operation of the block diagram of FIG. 5; and, FIG. 8 is a detailed electrical schematic diagram of a board decode circuitry of the apparatus embodying the present invention.

DESCRIPTION OF THE APPARATUS

Broadly stated, the head scanner servo system of the present invention is controlled by a microprocessor which also controls the other major servos of a tape recording and reproducing apparatus, the other servos of which include: (1) a capstan servo which controls the movement of the tape during recording and during most, but not all, reproducing operations; (2) the automatic scan tracking servo which controls transverse movement of the reproduce heads relative to the longitudinal direction of the track to have the head accurately follow a track during reproducing and particularly during special motion reproducing wherein the tape is being transported at a speed other than normal playback speed; (3) the reel servos which control the tensioning of the tape during recording and reproducing operations and the movement of the tape during shuttle operation; and, (4) the scanning head servo of the present invention which rotates the recording and reproducing heads at the proper speed during such respective operations. The microprocessor receives digital information as well as digitally converted analog information from various locations throughout the circuitry and apparatus, processes such information and thereafter provides digital output signals to other circuitry, some signals of which are converted into the analog domain for controlling the various operations that are performed by the apparatus in its various modes. The nature of the operation of the other servos and the circuitry that carries out the operations thereof will not be specifically described herein, but such servos are comprehensively described in the cross reference related application entitled "Microprocessor Controlled Multiple Servo System for a Recording and/or Reproducing Apparatus", Ser. No. 364,725, filed on even date herewith and assigned to the same assignee as the present invention. The specification and drawings of such application are specifically incorporated by reference herein.

Figure 1:
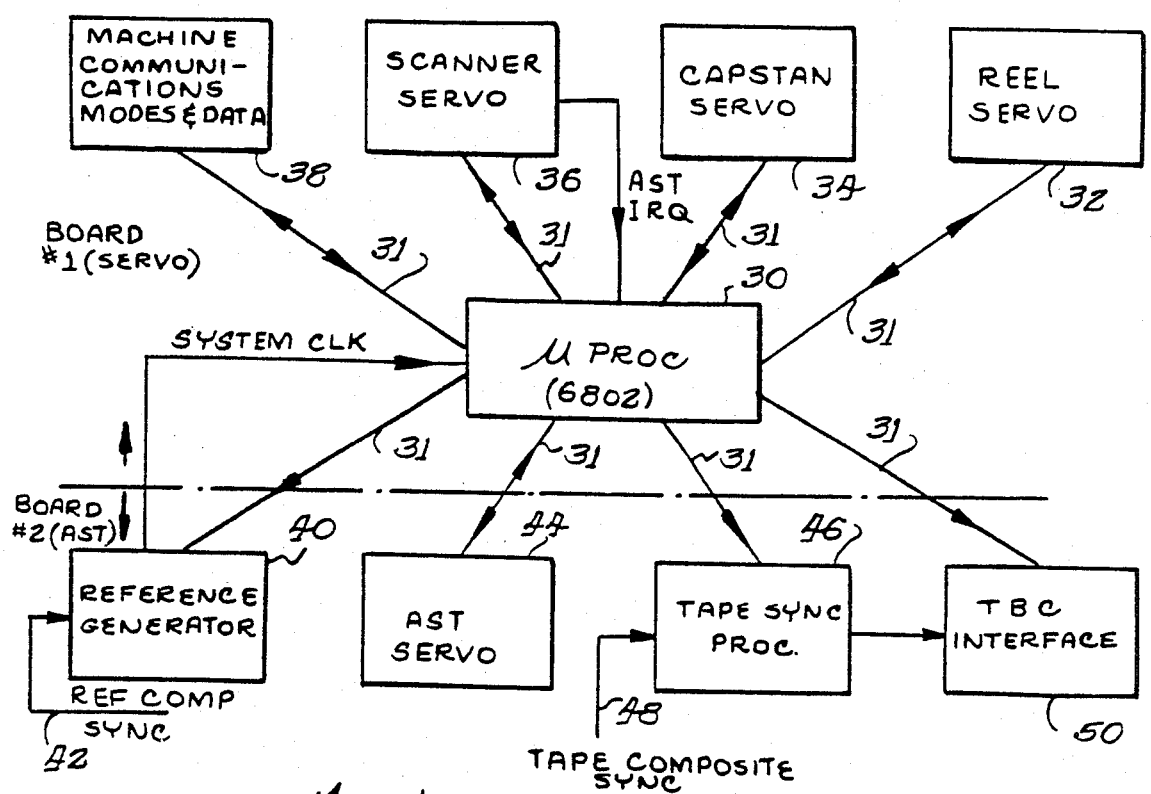
FIG. 1 is a functional block diagram illustrating the functional interaction of the microprocessor with the various servo systems of the apparatus, and of the microprocessor and other importannt circuitry.

Turning initially to the block diagram of FIG. 1, there is shown a microprocessor 30 which is interconnected by a data bus 31 with a reel servo 32, a capstan servo 34, a head scanner servo 36 and a machine communication interface and data 38 which essentially controls the various modes of the recording and reproducing apparatus as manipulated by an operator or from a remote location. The microprocessor also interacts with a reference generator 40 which receives as an input thereto a reference station composite sync signal via line 42 and the reference generator generates system clocks which clock the microprocessor and which in turn synchronizes all of the clock timing of the servos and other circuitry. The microprocessor also interacts with the automatic scan tracking servo 44 and a tape sync processor 46 which has a tape composite sync signal input via line 48. The tape sync processor additionally provides a signal to the time base corrector interface 50 which provides appropriate timing and control signals for use by the time base corrector to provide a broadcast quality video image having the requisite stability and vertical display position with respect to system reference as well as the correct chroma information, which processing varies depending upon what reproducing mode the apparatus is being operated.

Figure 2:
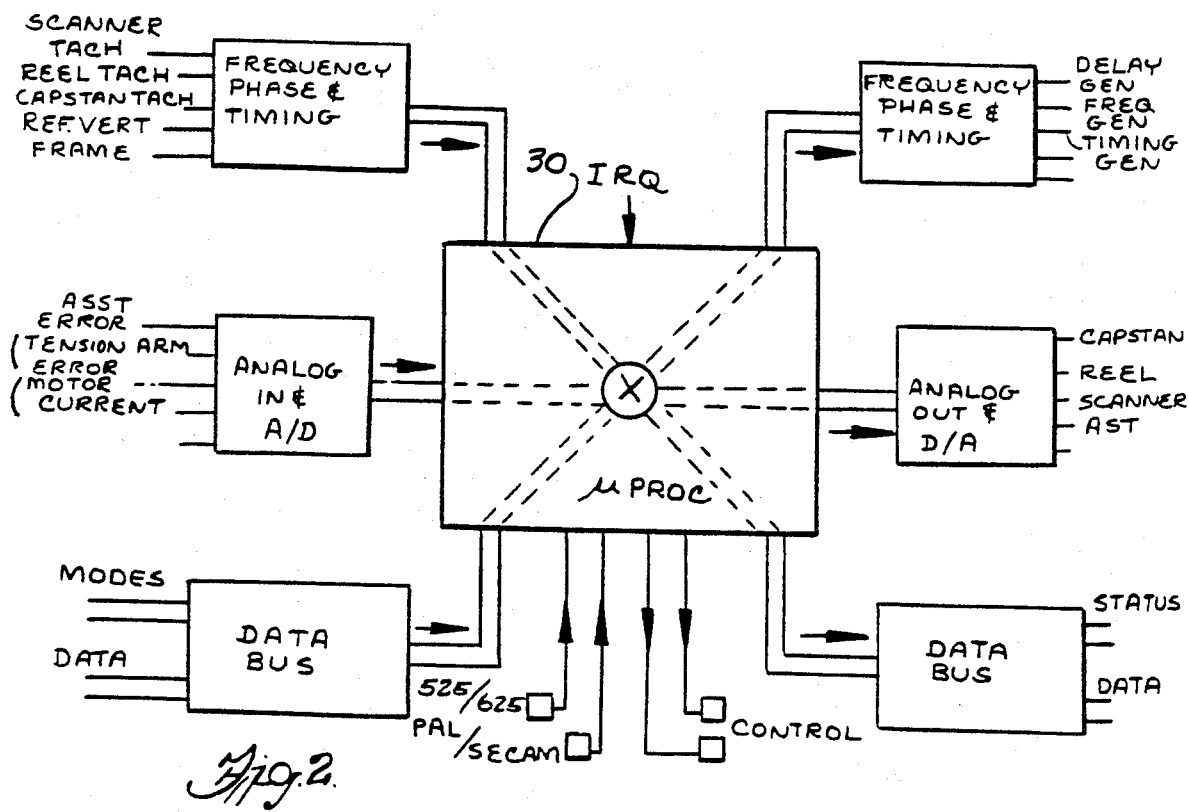
FIG. 2 is another functional block diagram of the microprocessor and illustrates the manner in which it receives input information relating to the operation of the apparatus and provides output signals that are used to control the operation of the apparatus.

While the functional block diagrams shown in FIG. 1 illustrate the interaction of the microprocessor with the various servo systems of the apparatus, with machine control and with the time base corrector and the like, the system can also be functionally described in terms of input and output signals that are provided to and from the microprocessor and this functional block diagram is shown in FIG. 2. The microprocessor 30 receives frequency, phase and timing data shown by the upper left functional block including such input signals as head scanner tach pulses, reel tach pulses, capstan tach pulses, reference vertical and frame timing signals, which are converted into digital information for processing by the microprocessor. The microprocessor also receives analog information shown by the block left of the microprocessor which is converted into digital information for processing by the microprocessor and such analog input signals include the automatic scan tracking error signals, the tension arm error signals and various signals related to motor currents of the reel drive motors, the capstan drive motor and the head scanner drive motor. The data bus also receives operating mode information as well as other machine control data and it processes this information and provides status information and other data. The microprocessor generates digital information which is converted to analog information and these analog output signals include control signals for the capstan servo, the reel servo, the head scanner servo and the automatic scan tracking servo. Similarly, the microprocessor provides frequency, phase and timing output information which include delay signals, phase and timing output information that are used by the various servos and other circuits of the apparatus.

The microprocessor controlled system of the present invention has a unique advantage in that it is adaptable for recording and reproducing video signals from any standard worldwide format, i.e., it can record and reproduce a NTSC signal having 525 lines or a PAL or SECAM signal having 625 horizontal lines. The input control line can be set to operate either as a 525 or 625 line system and the various constants and other software values which control the servos and other circuitry of the apparatus will be selected for proper operation. Similarly, another control line can be set for either a PAL or SECAM format system once a 625 line system is specified. The software in memory includes instructions and numerical constants that will permit the apparatus to properly operate regardless of the television signal format that is.

In accordance with an aspect of the present apparatus, the microprocessor controlled servo system described herein is adapted to control the reel servo system and the head scanner servo system during the high speed shuttle mode in a way so as to protect the recording and reproducing heads, while the tape is being wound off one of the reels onto the other. In the past, as the tape was nearing the end so as to be wound on a single reel during high speed shuttle, the potential for chipping the ceramic recording and reproducing heads was quite high. In accordance with an aspect of the apparatus described herein, during high speed shuttle, reel tape pack diameter information that is determined by the microprocessor is used to control the reel servo and the scanning head servo to perform a sequence of events which substantially reduce if not eliminate the possibility of heads being chipped. When the microprocessor determines that the tape has almost reached the end of being wound off of one reel, it controls the reel servo to stop the tape and it also reverses the head scanner motor current to brake the rotation of the heads. After the tape has been stopped, the reel servo moves the tape at a relatively slow rate, e.g., twice normal recording speed, and the rotating head assembly is allowed to coast while the tape is wound entirely off of one reel on to the other.

The apparatus is programmed to operate in various operating modes as is shown in the broad flow chart of FIG. 3a. The flow chart representing microprocessor software shows that once the machine is initialized, a mode is selected and these modes include stop, record, slow and fast motion reproduce, stop motion or still frame reproduce, ready and normal play. Once the apparatus is placed in an operating mode, then it undergoes a mode test to determine if it is a valid mode and if such is the case, it will return to that mode and begin running the program that controls the appartus in that mode. If the mode test is invalid, then it will return to the stop mode and the apparatus will stop. After the apparatus is placed in a valid mode, it will continue in that mode until some event occurs, such as a mode change or a completion of some operation. Included as part of each operating mode are various subroutines which are called as shown in FIG. 3a. Certain ones of these subroutines are used in various ones of the operating modes. For example, the play mode will contain a block of code instructions that will call up various subroutines in the specified order. As long as the apparatus is operating in the play mode it will repetitively go through this block of code instructions. When the head scanner tachometer pulse occurs, it will cause an interrupt to the microprocessor as shown in FIG. 3b.

The microprocessor operates on an interrupt basis, with an interrupt resulting from one of three inputs. The software determines which input caused the interrupt and the microprocessor then enters the appropriate block of code which runs through various subroutines until it reaches the end and then returns to the instruction that had previously been completed prior to the interrupt. The scanner tachometer pulse originally triggered a counter which has a count that exceeds the maximum time required to store all current relevant information in stack registers in the microprocessor. When this is done, it is ready to immediately perform the instructions in the scanner 1 block of code. This is carried out by the scanner interrupt block of code which causes the microprocessor to store the information and then literally wait for the scanner 1 interrupt. After the scanner 1 block of code is run, the microprocessor removes the information from the stack registers and resumes running through the instructions specified by the operating mode.

Complete software for operating the microprocessor for controlling all of the servos and other operations shown in the block diagrams of FIGS. 1, 2, 3a and 3b is contained in the computer code listings attached hereto as Appendix A. The program is written in a clear and concise manner to minimize the amount of memory that is required to perform the various operations. In this regard, FIG. 4 illustrates a memory map having 32,000 memory locations. As is shown in FIG. 1, the entire circuitry for the various servos and other operations are contained in two printed circuit boards with the upper first board containing most servos and the microprocessor itself and the second board containing the automatic scan tracking servo, reference generator, tape sync processor and time base corrector interface circuitry. In the memory map shown in FIG. 4, the program is written to utilize various portions of the 32K memory and the memory is segregated into eight separate 4K sections S0 through S7, which are decoded by address bits 12 through 14 which are used to place memory instructions in certain areas of the memory. For example, the address area $S_4$ is used to identify the input/output circuitry of the first board and area $S_5$ identifies a 4K section of memory wherein instructions relating to the operation of input/output portion of the second board are contained. Sections $S_1$, $S_2$ and $S_3$ are shown to be decoded but are not used during operation of the apparatus. Thus, from the illustration of FIG. 4 it should be appreciated that the entire operation of all of the servos and other operations shown in the block diagram of FIGS. 1 and 2 are carried out utilizing less than 4K of program. The operation of the head scanner servo system will now be broadly described on a functional level, followed by a more detailed description of the servo as well as other portions of the microprocessor controlled system.

BROAD SCANNING HEAD SERVO DESCRIPTION

In accordance with the present invention, the scanning head servo is controlled by the microprocessor 30 as shown by the functional block diagram of FIG. 5. The block diagram shows that the majority of the functions are performed within the microprocessor 30 and output signals are produced for application to circuitry external to the microprocessor.

The head scanner servo comprises two loops, i.e., a phase loop and a velocity loop. A scanner tachometer input is applied to each of the loops via a line 100. The phase adjustment loop has a vertical reference signal applied via input line 102 to a phase adjustment delay generator 104 which has output line 106 providing one input to a phase detector 108 which is essentially a comparator that measures the phase difference between the reference signal and the tachometer signal. The difference represents an error signal that is applied to a digital-to-analog converter 110 which provides an analog output signal on output line 112 that is summed into a junction 114 to a motor driver amplifier 116 for controlling a head scanner drive motor 118. A capacitor and resistor lead/lag phase error circuit 120 is provided to compensate the phase loop of the scanner servo.

The other loop is a standard velocity loop that uses the tachometer signals from line 100 which are applied to a delay circuit 122 which provides a delayed scanner tachometer signal on line 124 that is applied to one input of a second comparator 126. The other input of the comparator 126 receives undelayed tachometer signal information. An output 128 of the comparator 126 provides an error signal that is also converted by a digital-to-analog connector 130 to an analog signal on line 132 that is summed at junction 114 into the input of the motor drive amplifier. The scanner servo is much more accurate than many prior art devices because the delays are very accurate. This is due to the fact that the delays are computed to a very high resolution by the microprocessor. In this regard, for a 625 PAL or SECAM system, an internal microprocessor timer has a period of 20,000 microseconds which means that the delay is accurate to one part in 20,000 microseconds. This permits the gain bandwidth of the velocity loop to be increased quite significantly to obtain better and more accurate control. It also enables the velocity loop to perform the majority of the error correction and the phase loop merely provides the proper positioning of the scanner, i.e., it is merely a positioning loop. The counting function and error determining portions of both of the loops are performed by the microprocessor and the only portion of the functional block diagram that is performed outside of the microprocessor is from the digital-to-analog converter through the motor drive amplifier.

THE MICROPROCESSOR CIRCUITRY

Figure 6A:
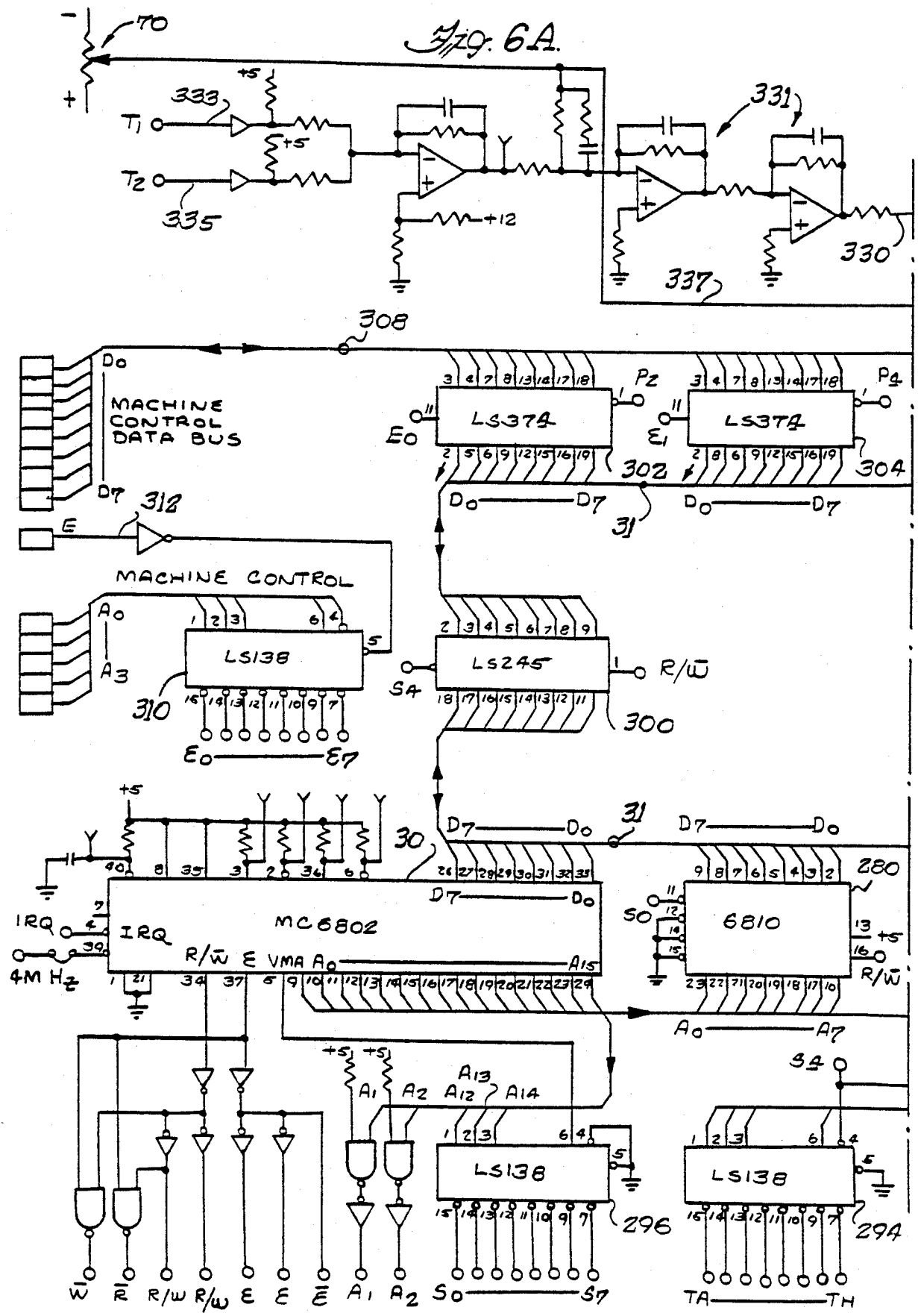
FIGS. 6a and 6b together comprise a detailed electrical schematic diagram illustrating the microprocessor together with machine control interfacing circuitry and multiplexing analog-to-digital converting circuitry.

Before describing the detailed electrical circuit schematic diagrams of the head scanner servo previously described with respect to the functional block diagram of FIG. 5, the schematic diagrams which contain the microprocessor 30 itself will be briefly described in connection with FIGS. 6a and 6b which together comprise a single schematic. As previously mentioned, and as has been shown by the block diagram of FIG. 1, the bulk of the circuitry of the apparatus described herein is contained on only two printed circuit boards and one of said printed circuit boards contains the microprocessor itself. The layout of the circuitry is such that address control of bidirectional buffers enable the data bus from the microprocessor to be connected to either the first or the second printed circuit board. As shown in FIG. 6a, the microprocessor 30, which is a Motorola integrated circuit Model MC 6802 has 16 address lines which address circuit components as well as specific addresses of memory circuits. As shown on the lower portion of the microprocessor 30 in FIG. 6a, address lines $A_0$ through $A_{15}$ extend rightwardly to a random access memory 280 which is controlled by address lines $A_0$ through $A_7$, as well as respective programmable read only memories 282 and 284 (FIG. 6b) which are controlled by address lines $A_0$ through $A_{11}$. The address lines also extend to a buffer 286 which has output lines indicated generally at 288 which extend to the second printed circuit board address lines. The lines 288 also extend downwardly to respectively decoder integrated circuits 290 and 292 which are used to select ports $P_0$ through $P_{15}$. The address lines also extend to yet another decoder 294 which provides selection of various programmable timer integrated circuits $T_A$ through $T_H$.

Decoders 290, 292 and 294 are enabled when a master decode enable line $S_4$ is active and this is provided by a master decode circuit 296 located to the left of the decoder 294. As is clearly illustrated, address lines $A_{12}$, $A_{13}$ and $A_{14}$ from the microprocessor 30 control the address selection master decode enable output lines $S_0$ through $S_7$ that activate various portions of the circuitry. For example, when active the decoded output line $S_0$ enables the random access memory 280, decode output $S_6$ enables the memory 282 and decode output $S_7$ similarly enables memory 284. The data bus 31 from the microprocessor comprises eight output lines $D_0$ through $D_7$ extending to the memories 280, 282, 284 as well as to bidirectional buffers 298 and 300. Buffer 290 has output lines that extend the data bus to the second printed circuit board, and it is activated by the decode output $S_5$. Activation of the decode output $S_4$ enables the decoders 290, 292 and 294 as well as the other bidirectional buffer 300 which effectively extends the data bus to the remaining circuitry shown in the upper portion of FIGS. 6a and 6b and to remaining circuitry on board No. 1.

Figure 6B:
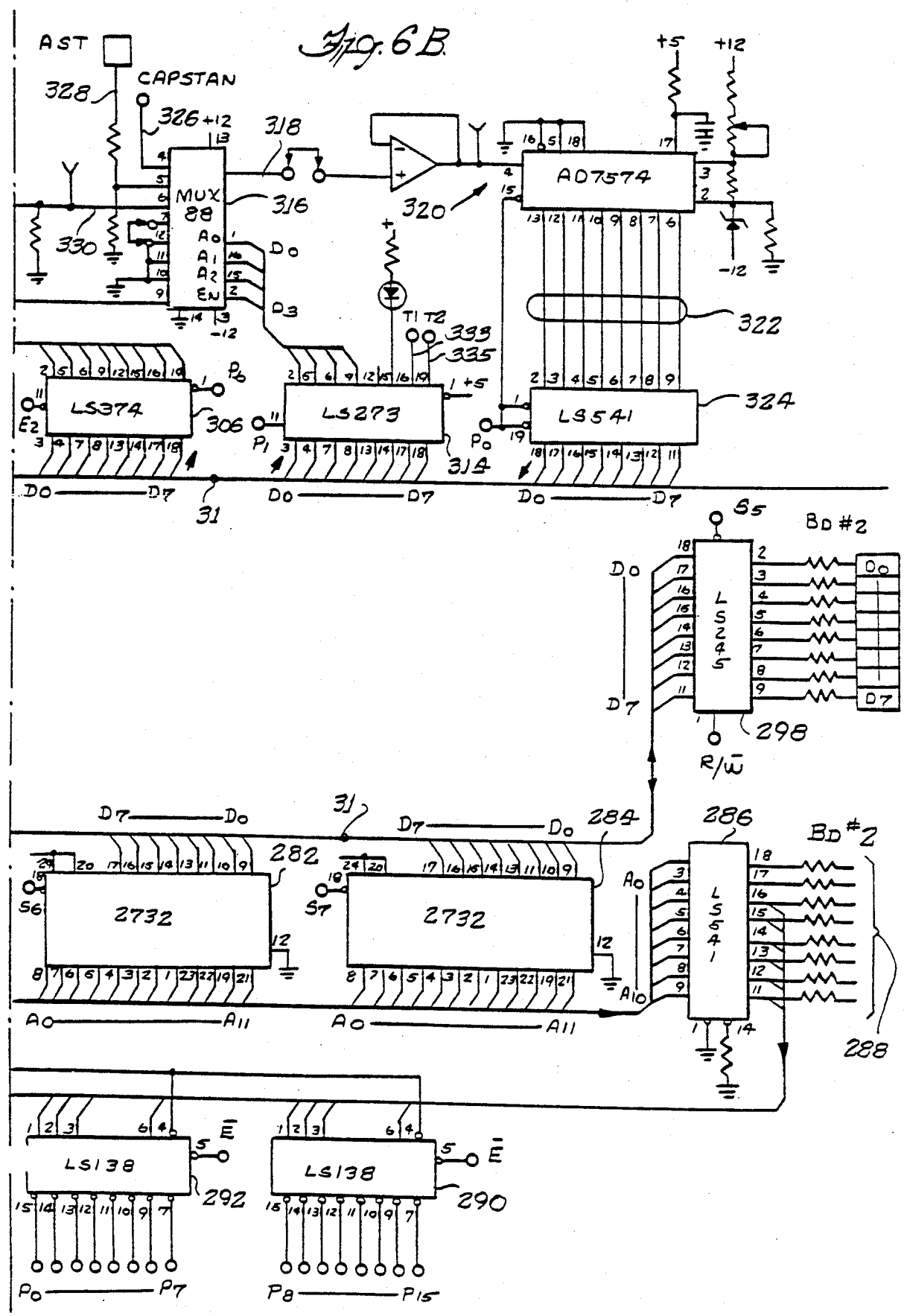

As shown in FIG. 6a, the data bus 31 has input latches 302 and 304 connected thereto and an output latch 306 being shown in FIG. 6b. The data lines 308 are also connected to these latches and the lines 308 represent a data bus to the machine control system which has a separate microprocessor controlled system for carrying out other machine control functions of the apparatus independently of the system controlled by microprocessor 30. The interaction of operator control and mode switches, diagnostics and the like with the servo system of the present invention is carried out through this data bus via the latches 302, 304 and 306. These latches are respectively enabled by enable lines $E_0$, $E_1$ and $E_2$ which are decoded outputs of a decoder circuit 310 that has operator activated address lines $A_0$ through $A_3$ from the machine control system. The decode circuit 310 is enabled by a line 312 from the machine control system. By selectively enabling decode output lines $E_0$, $E_1$ and $E_2$, data can be input into the latches 302 and 304 for communication onto the data bus of the microprocessor 30 and enabling the latch 306 permits data from the microprocessor 30 to be latched therein for communication to the machine control system via lines 308.

The remaining portion of the circuitry shown in the upper portion of FIGS. 6a and 6b concern the analog information input that is provided to the microprocessor 30. When port $P_1$ from decoder 292 is active, a latch 314 that is connected to the data bus can receive a data word which decodes an address for controlling a multiplexing switch 316. The switch 316 selects one of the left inputs thereof for application onto line 318 that extends to an analog-to-digital converter, indicated generally at 320, having output lines 322 which extend to a latch 324 which applies data onto the data bus for use by the microprocessor when a port line $P_0$ is enabled from the address decoder 292.

The multiplexing switch 316 can select a capstan servo control track error signal applied via line 326, an automatic scan tracking movable element position error signal applied via line 328 or a signal that is indicative of the position of the tension arm 70 applied via line 330. The circuitry at the upper portion of FIG. 6a provides an analog signal on line 330 that represents the position of the previously described tension arm through appropriate loop compensation circuitry indicated generally at 331. The arm positional reference for forward and reverse arm locations during shuttle and still frame reproducing is set by coding lines 333 and 335 by means of the output latch 314 from the microprocessor. In addition, line 337 can be selected to measure the actual mechanical arm position for tape threading and unthreading.

THE SCANNING HEAD SERVO CIRCUITRY

The detailed circuitry which carries out the operation of the rotating head or scanner servo shown in the block diagram of FIG. 5 is shown in FIG. 7. As previously mentioned, the scanner servo is comprised of two servo loops, i.e., a velocity servo loop and a phase servo loop. Since the accuracy of the velocity servo loop is exceedingly high, the phase servo actually operates as a positioning servo loop to properly phase locate the scanner once it has been synchronized or locked by virtue of the operation of the velocity servo loop. The scanner servo circuitry is extremely powerful and flexible in the breadth of its operational capabilities, in part due to the fact that it is under microprocessor control. By virtue of this fact, the scanner phase position can be easily advanced or retarded relative to reference vertical and can be further manipulated to accommodate various time base corrector apparatus which may require varying lead times.

Now turning specifically to FIG. 7, a scanner tachometer pulse synchronous with head rotation is applied to input line 550 which is connected to a low impedance input amplifier 552, the output of which appears on line 554 which is capacitively coupled to a slicer 556. The output line 558 of the slicer provides a timing pulse that is independent of the amplitude of the input signal from the scanner tachometer applied on input line 550. This pulse clocks a D flip-flop 560 which has its Q output 563 connected to a tachometer delay one-shot 564 of a timer chip 566 and to a gate 568. Its Q output line 562 is connected to a tri-state buffer 570 that is in turn connected to the data bus 31. When a scanner tachometer pulse is applied to input line 550, a low signal is produced on line 562 which sets the tri-state buffer 570 as well as provides an interrupt signal (IRQ) on line 572 via gates 574 and 568. The interrupt is applied to the microprocessor which causes it to cease its current activity and determine where the interrupt originated. By virtue of the tri-state buffer 570 being activated, the microprocessor can determine that the interrupt originated from the first scanner tachometer pulse signal.

A particularly important aspect of the circuitry of the scanner servo system involves the capability of the microprocessor to accurately determine the phase of the tachometer and this is accomplished by providing a second scanner interrupt signal to the microprocessor following the first one, with the second interrupt being delayed by a predetermined time period that is slightly in excess of the maximum time required for the microprocessor to cease the present instruction and store all of the data that it is currently processing. In other words, since it may require upwards of 20 microseconds to complete the housekeeping activity before it can process another interrupt, the second scanner interrupt signal is delayed approximately 20 microseconds subsequently of the first interrupt and the microprocessor will thereby have time to complete its current operation and be ready to immediately process the second scanner interrupt. This permits the scanner servo to effect control of the head rotation with a timing resolution within one microsecond, which is within the resolving capability of the microprocessor.

To accomplish the delay, the scanner tachometer signal on line 563 is applied to the one-shot 564 which provides a delayed scanner tachometer signal on output 576 that is 20 microseconds later. This clocks a D flip-flop 578, so that its Q output line 580 is provided to the gate 574 to provide a second interrupt command on line 572. At the same time it activates gate 574, line 580 also sets a tri-state buffer 582 whose output is applied to the data bus so that when the second interrupt occurs, the microprocessor can strobe the tri-state buffer 582 and indeed determine that it is the delayed scanner tachometer interrupt. Once the second interrupt is received, the microprocessor can immediately examine the values in the timer chip 566 and in a timer chip 584 and determine if any velocity and/or phase error exists. In this regard, the timer chip 566 has a velocity ramp generator 586 that is clocked by a one MHz clock from the reference generator and at the occurrence of the second scanner tachometer interrupt, the microprocessor inspects the digital value that is present in the velocity generator at output lines 587 and then retriggers it.

Similarly, the timer chip 584 contains a vertical phase one-shot 588 which is triggered by reference vertical on input 590 which originates from the reference generator and this one-shot is variable in that it is under microprocessor control and its period can be advanced or retarded in accordance with instructions that are provided by the microprocessor, including the aspect previously described with respect to advancing or retarding the head rotation phase. The output from the vertical phase one-shot appears on line 592 which is connected to the input of a phase ramp generator 594 that is also clocked by the one MHz clock. The digital value of the phase ramp generator at output lines 595 is similarly examined at the occurrence of the second scanner tachometer interrupt to determine if any phase error exists. The existence of the input signal on line 592 will retrigger the phase ramp generator 594 and it will continue being clocked until the second interrupt occurs.

By virtue of the microprocessor obtaining the values from the velocity ramp generator 586 and the phase ramp generator 594, it then determines what, if any, phase and velocity error exists and applies an error signal through the data bus 31 to respective digital-to-analog converters 596 and 598. The digital-to-analog converter 596 has output lines which are connected to amplifier 600 which provides an output on line 602 which represents the velocity error and this is summed with a phase error component signal at the summing junction 603 that is obtained from the digital-to-analog converter 598 through lines which are connected to an amplifier 604 whose output is in turn connected by lines 605 to a second amplifier 606. The sum of the velocity and phase error appears on line 608 which extends to the motor drive amplifier which drives the scanner motor.

The timer chip 566 also includes a section 610 defined as the automatic scan tracking interrupt and it is a rate generator counter that is clocked by the one MHz clock and provides a high signal on output 612 which clocks a D flip-flop 614 which provides an interrupt signal on line 616 that extends to the gate 568 and provides an interrupt to the microprocessor. The microprocessor knows that the interrupt from the automatic scan tracking counter is an automatic scan tracking interrupt as opposed to a scanner or delayed scanner tachometer interrupt by virtue of the fact that both of the tri-state buffer 570 and 582 are inactive. After the interrupts have occurred, the microprocessor is adapted to clear the flip-flops 560, 578 and 614 via reset lines 618, 620 and 622, respectively, connected to tri-state latches 624, 626 and 628 which receive their activating signals from the microprocessor via the data bus.

As previously mentioned, the apparatus may be operatively connected to various types of time base correctors which require varying amounts of head rotation or phase advancement depending upon the amount of delay that is necessary for the operation of the particular time base corrector and in this regard, an input buffer 630 is provided which has eight bits of information that are effectively applied by a dip switch 632 that may be set to provide the proper amount of phase adjustment of the scanner. It is contemplated that eight bits of tachometer phase adjustment is not required so that the input buffer 630 may be effectively divided into two functions, with the rightmost four lines providing scanner phase tachometer adjustment, whereas the four leftmost lines may provide initiation of test modes. When the microprocessor strokes the buffer 630, it obtains the number therein for operating the scanner phase adjustment and uses this to vary the time of the vertical phase-one shot 588 which triggers the phase ramp generator 594. In this manner, the vertical phases can be moved appropriately for the particular time base corrector that is being used with the apparatus.

CONCLUSION

From the foregoing detailed description, it should be appreciated that an improved scanning head servo has been shown and described which has extraordinary accuracy due to the fact that it is microprocessor controlled in a unique way wherein the resolving power of the servo is essentially the resolving power of the microprocessor itself. More particularly, the microprocessor is controlled in a unique manner whereby when interrupts occur, the microprocessor stops its operations, stores all current information and waits for a delayed scanner interrupt to occur which enables the microprocessor to immediately process the subsequent interrupt. This enables the microprocessor to immediately carry out the scanning head servo operation and thereby control the scanner with extraordinary accuracy. The extraordinary accuracy enables the velocity closed servo loop to perform the major portion of the work that is required of the scanner servo and the phase closed servo loop can then function as a phase positioning loop in the true sense. By virtue of the microprocessor control, the scanning head servo can be easily switched to operate in either NTSC, PAL or SECAM format and it can also be easily adjusted to provide the proper degree of phase advancement to compensate for the delay that is required by any time base corrector associated with the machine.

Figure 8:
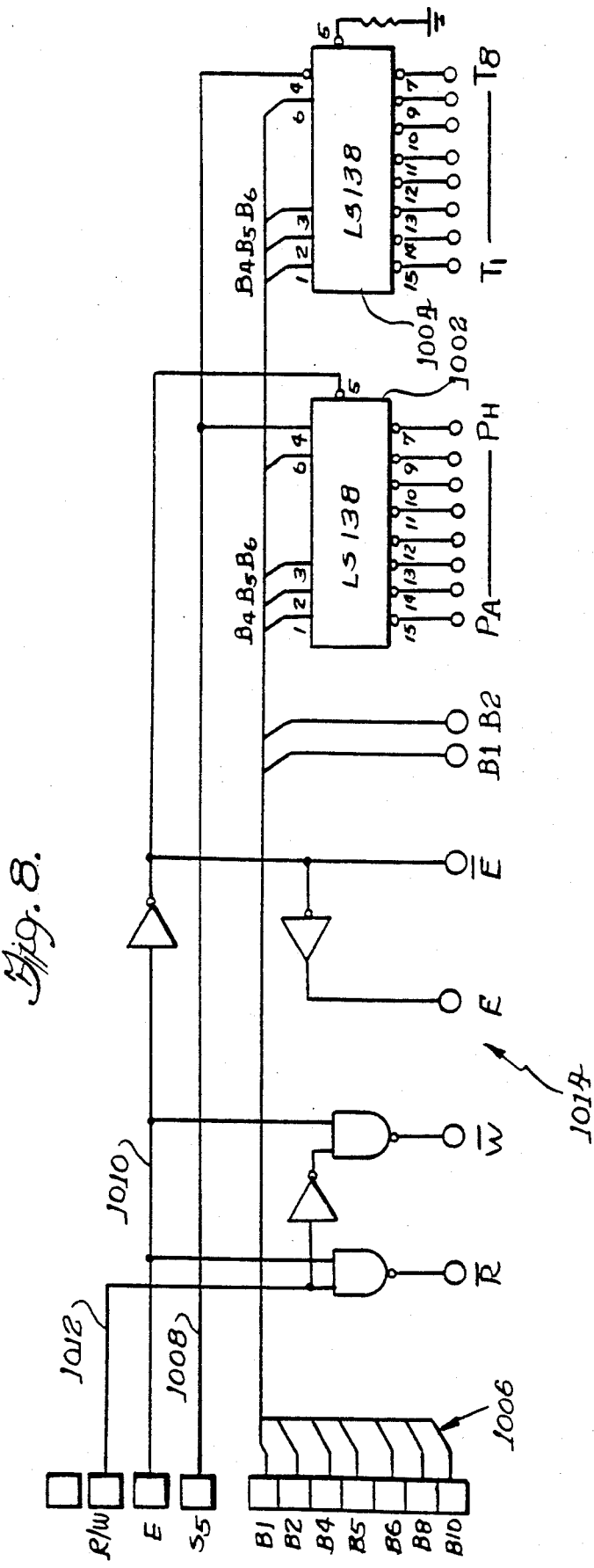

Two sets of port and timer circuit decoders are employed in the preferred apparatus of the invention. One set has been previously described with reference to FIGS. 6a and 6b, namely port decoders 290 and 292 (FIG. 6b) and timer circuit decoder 294 (FIG. 6a). FIG. 8 illustrates the second set of decoders comprising port decoder 1002 and timer circuit decoder 1004. The first set of decoders illustrated in FIGS. 6a and 6b respond to selected ones of the address signals A0–A15 issued by the microprocessor 30, selected ones of the master enabling signals S0–S7 issued by decoder 296 and system clock signal E to enable selectively ports and timer circuits of the machine communication circuitry 38, scanner servo 36, capstan servo 34 and reel servo 38 (FIG. 1). The second set of decoders illustrated in FIG. 8 similarly function to issue selectively port enabling signals (decoder 1002) and timer circuit enabling signals (decoder 1004) to the reference generator 40, the AST servo 44, tape sync processor 46 and TBC interface 50 (FIG. 1). More specifically, the second set of decoders receives buffered address signals over lines 1006 from the buffers 286 (FIG. 6b). These address signals together with master decode select signal S5 received over line 1008 from the master decoder 296 (FIG. 6a) and the system clock signal E received from the microprocessor 30 over line 1010 enable the decoders 1002 and 1004 to issue the port and timer circuit enabling signals according to the functions being performed by the apparatus as determined by the operator manipulated controls and the controlling microprocessor software. In addition, the second set of decoders receives a read/write command R/W from the microprocessor 30 (FIG. 6a) over line 1012 and, through logic 1014 comprising NAND gates and inverters, generates retimed read command R, write command W and oppositely phased master clock signals E and E. These signals are employed together with the port and timer circuit enable signals to control the operation of aforementioned reference generator 40, AST servo 44, tape sync processor 46 and TBC interface 50.

It should be understood that although preferred embodiments of the present invention have been illustrated and described, various modifications thereof will become apparent to those skilled in the art; and, accordingly, the scope of the present invention should be defined only by the appended claims and equivalents thereof.

Various features of the invention are set forth in the following claims.

What is claimed is:

1. A servo control apparatus for controlling the rotational velocity and phase of a rotating mechanism driven by a drive means, said apparatus comprising:
   means for providing a signal at a predetermined location during each revolution of said rotating means;
   first servo means for controlling the rotational velocity of said rotating mechanism and including a first high resolution counting means for providing a count indicative of the period of rotation of the rotating mechanism, said counting means being reset and triggered by a reset signal;
   second servo means for controlling the phase of the rotation of the rotating mechanism and including a second high resolution counting means for providing an output at a predetermined count, said second counting means being triggered by a reference phase signal, a third high resolution counting means for providing a count indicative of the phase position of said rotating mechanism and triggered by said second counting means output, said third counting means being reset and triggered by said reset signal.
   processing means for determining the count of said first and third counting means and for providing said reset signal to the same, said processing means comparing the determined count of said first counting means with a predetermined count and generating a first error signal and applying the same to the drive means, said processing means comparing the determined count of said third counting means and comparing the same with a predetermined count and generating a second error signal and applying the same to the drive means.

2. Apparatus as defined in claim 1 further comprising a digital-to-analog converter operatively connected to the processing means for receiving the first error signal and converting the same to an analog output signal, amplifier means operatively connected to the digital-to-analog converter means for providing an amplified drive signal to said drive means.

3. Apparatus as defined in claim 1 further comprising a digital-to-analog converter operatively connected to the third counting means for receiving the second error signal and converting the same to an analog output signal, amplifier means operatively connected to the digital-to-analog converter means for providing an amplified drive signal to said drive means.

4. Apparatus as defined in claim 1 wherein said predetermined location signal is applied to said processing means and to a fourth counting means, said fourth counting means providing an output at a predetermined count, said output signal being applied to said processing means, the predetermined location signal interrupting the processing means causing said processing means to complete its current instruction, store all relevant information in storage registers and be ready to process a subsequent interrupt, the output of said fourth counting means providing said subsequent interrupt, said subsequent interrupt causing said processing means to issue said reset signal to said first and third counting means.

5. Apparatus as defined in claim 4 wherein said predetermined count of said fourth counting means exceeds the maximum time required for the processing means to complete a current instruction, store all relevant information in said storage registers and be ready to process the subsequent interrupt.

6. Apparatus as defined in claim 1 wherein said second counting means is programmable so as to provide a preselected count, said processing means being adapted to change the count therein to thereby alter the phase position of said rotating mechanism.

7. Apparatus as defined in claim 6 including a digital switch means having presettable binary positions for providing a unique digital word that can be read by said processing means for setting the count value of said second counting means.

8. Apparatus as defined in claim 1 wherein said first and third counting means are programmable counters.

9. Apparatus as defined in claim 1 wherein said means for providing the signal at a predetermined location comprises a tachometer associated with said rotating mechanism.

10. Apparatus as defined in claim 1 wherein said first, second and third high resolution counting means provides at least approximately 20,000 counts per revolution of said rotating mechanism.

11. In a servo system for controlling a rotating mechanism driven by a drive means and wherein the mechanism has a tachometer which provides a tachometer signal during rotation of the rotating mechanism and wherein the servo system includes a processing means that is clocked by a high rate clock signal and said processing means is not dedicated exclusively to the control of the rotating mechanism, apparatus for insuring that the servo system operates with a resolving power of the processing means, comprising:

means interconnecting said tachometer signal to said processing means for interrupting the same, the interrupt causing said processing means to complete its current instruction and store all relevant information in storage registers and wait for a second interrupt;

a counting means connected to the tachometer signal providing means and being triggered by the tachometer signal and providing a second interrupt signal to said processing means when said counting means reaches a predetermined count, the occurrence of said second interrupt enabling said processing means to immediately process servo control operations.

12. A method of controlling a processing means in a servo system for controlling a rotating mechanism driven by a drive means and wherein the mechanism has a tachometer which provides a tachometer signal during rotation of the rotating mechanism and wherein the servo system includes a processing means that is clocked by a high rate clock signal and said processing means is not dedicated exclusively to the control of the servo for the rotating mechanism, the method comprising the steps of:

providing the tachometer signal to the processing means for interrupting the processing means to cause the same to complete its current instruction and store all current information in storage registers and thereafter wait for a second interrupt;

providing said tachometer signal to a counting means for triggering the same so that said counting means interrupts said processing means when it reaches a predetermined count, the predetermined count being greater than the time required for the processing means to complete its current instruction, store all current information in storage registers and wait for the second interrupt, whereby the occurrence of the second interrupt enables said processing means to immediately perform servo control instruction.

13. A servo control apparatus for controlling the rotational velocity and phase of a rotating mechanism driven by a drive means, said apparatus comprising:

first servo means for controlling the rotational velocity of said rotating mechanism and including a first counting means for providing a digital count signal indicative of the period of rotation of the rotating mechanism;

second servo means for controlling the phase of the rotation of the rotating mechanism and including a second counting means for providing a digital count signal indicative of the phase position of said rotating mechanism;

processing means for determining the counts of said first and second counting means, said processing means comparing the determined count of said first counting means with a predetermined count and generating a first error signal, said processing means comparing the determined count of said second counting means with a predetermined count and generating a second error signal; and means for summing the first and second error signals and applying the summed signals to the drive means.

14. Apparatus for providing coordinated control of a servo system and at least one other function, comprising:

means responsive to movement of an element of said servo system for generating a signal indicative of the value of a parameter of said servo system;

means responsive to movement of said element for generating an interrupt signal;

delay means responsive to said interrupt signal for generating a control signal a predetermined time period after the occurrence of said interrupt signal; and processing means for controlling said servo system and said other function, said processing means being responsive to said interrupt signal to temporarily cease processing operations related to the control of said other function and being responsive to said control signal to process said parameter signal and provide an output signal for controlling said servo system.

15. The apparatus of claim 14 wherein said parameter is the velocity of said servosystem.

16. The apparatus of claim 15 further including means responsive to movement of said servosystem for generating a signal indicative of the phase of said servosystem, said processing means being responsive to said control signal to process both of the signals respectively indicative of the velicity and phase of the servosystem and to provide output signals for controlling each of the velocity and phase of the servosystem.

17. The apparatus of claim 14 wherein said parameter is the phase of said servosystem.

18. In a magnetic tape recording and reproducing apparatus of the type having a servo-controlled head scanner for moving recording and reproducing heads relative to a magnetic tape, apparatus for controlling the head scanner in accordance with either of at least two control systems, comprising:

means for generating a reference signal indicative of a reference location for the head scanner;

delay means for generating a trigger signal a time period after generation of the reference signal;

a counter actuated by said trigger signal to begin counting clock pulses;

a processor responsive to movement of said head scanner for reading the contents of said counter and producing a servo-control signal in response thereto; and means for varying the time period of said delay means in accordance with different control systems.

* * * * *

UNITED STATES PATENT AND TRADEMARK OFFICE
CERTIFICATE OF CORRECTION

PATENT NO. : 4,514,671
DATED : April 30, 1985
INVENTOR(S) : Kenneth Louth

It is certified that error appears in the above-identified patent and that said Letters Patent are hereby corrected as shown below:

Column 13, line 57, "controlling a" should read --controlling of a --;

Column 15, line 23, "velocity" should read--velocity--;

Column 5, line 2, "format that is." should read --format that is selected.--;

Column 6, line 47, "is controlled" should read --is also controlled--;

Column 9, line 34, "Q output 563" should read --$\bar{Q}$ output 563--;

Column 10, line 8, "gate 574, line 580" should read --gate 574, the Q output line 580 also--.

Signed and Sealed this

Eighth Day of October 1985

[SEAL]

Attest:

Attesting Officer

DONALD J. QUIGG

Commissioner of Patents and
Trademarks—Designate